United States Patent
Kannan et al.

(10) Patent No.: US 9,828,485 B2
(45) Date of Patent: *Nov. 28, 2017

(54) BIODEGRADABLE ALIPHATIC-AROMATIC COPOLYESTERS, COMPOSITIONS THEREOF, METHODS OF MANUFACTURE, AND ARTICLES THEREOF

(71) Applicant: SABIC Global Technologies B.V., Bergen op Zoom (NL)

(72) Inventors: Ganesh Kannan, Evansville, IN (US); Husnu Alp Alidedeoglu, Evansville, IN (US); Robert Russell Gallucci, Mt. Vernon, IN (US)

(73) Assignee: SABIC GLOBAL TECHNOLOGIES B.V., Bergen op Zoom (NL)

( * ) Notice: Subject to any disclaimer, the term of this patent is extended or adjusted under 35 U.S.C. 154(b) by 124 days.

This patent is subject to a terminal disclaimer.

(21) Appl. No.: 14/321,025

(22) Filed: Jul. 1, 2014

(65) Prior Publication Data
US 2014/0316037 A1   Oct. 23, 2014

Related U.S. Application Data

(62) Division of application No. 12/823,629, filed on Jun. 25, 2010, now Pat. No. 8,796,356.

(51) Int. Cl.
| | |
|---|---|
| *H01L 23/29* | (2006.01) |
| *C08F 283/04* | (2006.01) |
| *C08G 69/48* | (2006.01) |
| *C08L 63/00* | (2006.01) |
| *C08L 77/00* | (2006.01) |
| *C08K 3/08* | (2006.01) |
| *C08K 3/34* | (2006.01) |
| *C08G 63/183* | (2006.01) |
| *C08G 63/91* | (2006.01) |
| *C08J 5/18* | (2006.01) |
| *C08L 67/02* | (2006.01) |
| *C08L 67/04* | (2006.01) |
| *C08K 5/13* | (2006.01) |

(52) U.S. Cl.
CPC .............. *C08K 3/34* (2013.01); *C08G 63/183* (2013.01); *C08G 63/916* (2013.01); *C08J 5/18* (2013.01); *C08K 5/13* (2013.01); *C08L 67/02* (2013.01); *C08L 67/04* (2013.01); *C08J 2367/02* (2013.01); *C08J 2367/04* (2013.01)

(58) Field of Classification Search
None
See application file for complete search history.

(56) References Cited

U.S. PATENT DOCUMENTS

| | | | |
|---|---|---|---|
| 3,669,921 A | 6/1972 | Droke et al. | |
| 3,951,886 A | 4/1976 | Miyake | |
| 4,328,059 A | 5/1982 | Horlbeck et al. | |
| 4,702,953 A | 10/1987 | Jonas et al. | |
| 5,446,079 A | 8/1995 | Buchanan et al. | |
| 6,020,393 A | 2/2000 | Khemani | |
| 6,713,595 B2 | 3/2004 | Chung et al. | |
| 7,129,301 B2 | 10/2006 | Wu et al. | |
| 7,439,317 B2 | 10/2008 | Suzuki et al. | |
| 7,815,727 B2 | 10/2010 | Kawato et al. | |
| 2006/0155099 A1* | 7/2006 | Wu | C08G 63/181 528/272 |
| 2007/0244242 A1* | 10/2007 | Agarwal | C08L 67/02 524/439 |
| 2008/0033077 A1 | 2/2008 | Hashimoto et al. | |
| 2008/0081882 A1 | 4/2008 | Tian et al. | |
| 2008/0081898 A1 | 4/2008 | Ross et al. | |
| 2008/0281018 A1 | 11/2008 | Seeliger et al. | |
| 2008/0312379 A1 | 12/2008 | Scherzer et al. | |

OTHER PUBLICATIONS

International Preliminary Report on Patentability for PCT/US2010/049926, dated Apr. 5, 2012, 4 pages.
International Search Report for PCT/US2010/049926 (P240001PCT) dated Nov. 17, 2010, 6 pages.
JPH07258532 (A), Publication date: Oct. 9, 1995, Abstract, 1 page.
Transmittal for IPRP for PCT/US2010/049926, dated Apr. 5, 2012, 1 page.
Written Opinion of the International Searching Authority for PCT/US2010/049926 dated Nov. 17, 2010, 4 pages.

* cited by examiner

*Primary Examiner* — Robert T Butcher
(74) *Attorney, Agent, or Firm* — Cantor Colburn LLP

(57) ABSTRACT

Biodegradable compositions containing an aliphatic-aromatic copolyester derived from aromatic polyesters. Methods of making the compositions and articles made from the compositions.

16 Claims, 1 Drawing Sheet

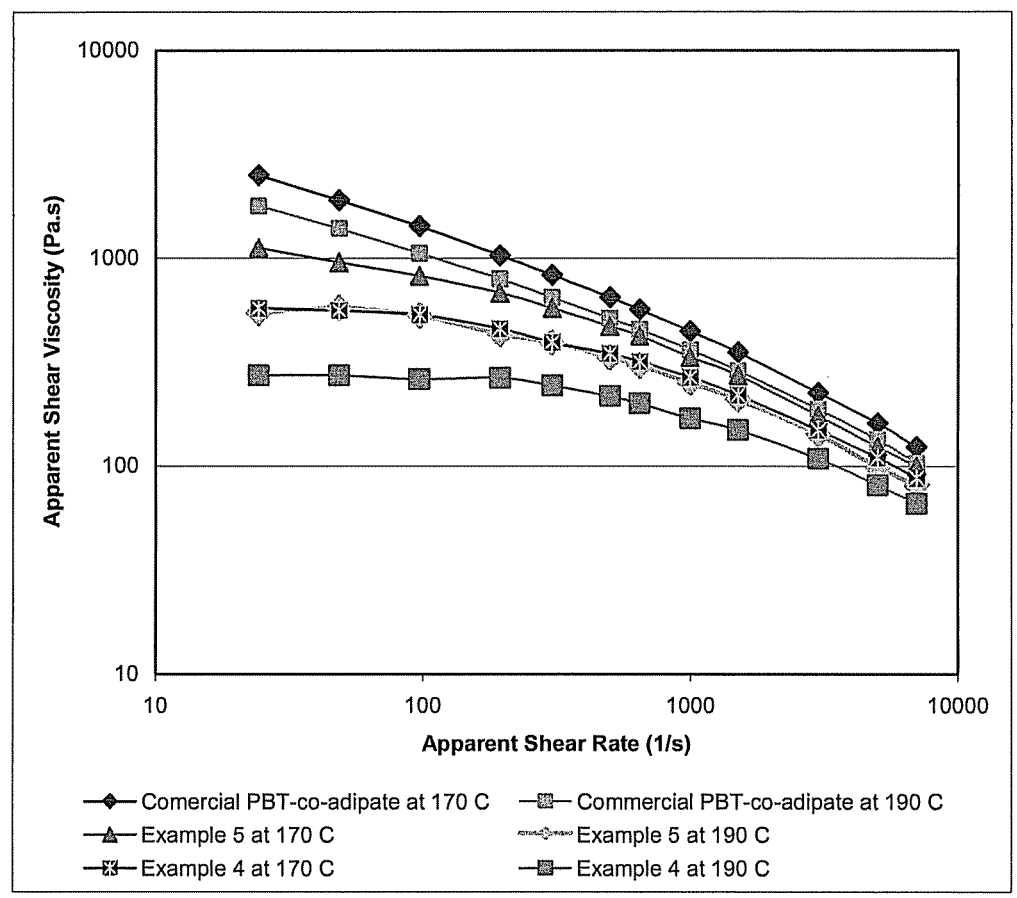

BIODEGRADABLE ALIPHATIC-AROMATIC COPOLYESTERS, COMPOSITIONS THEREOF, METHODS OF MANUFACTURE, AND ARTICLES THEREOF

CROSS-REFERENCE TO RELATED APPLICATION

This application is a division of U.S. patent application Ser. No. 12/823,629 filed Jun. 25, 2010, which claims the benefit of U.S. Provisional Application Ser. No. 61/245,073, the contents of which are incorporated by reference herein in their entirety.

BACKGROUND

This invention relates to biodegradable aliphatic-aromatic copolyesters, combinations thereof with other polymers, and methods of manufacture of the copolyesters and compositions. These polymers and combinations thereof are useful as molded or extruded plastic objects, films, and fibers.

It is well known that billions of pounds of poly(ethylene terephthalate) (PET) are discarded into landfills annually all over the world. Some of the PET that is not reused is currently incinerated. The disposal of PET into landfills or its incineration is harmful to the environment. If PET (scrap) material could be converted into a useful aliphatic-aromatic copolyester, then there would exist a valuable environmentally progressive way to meet the unmet need to effectively use underutilized scrap PET in aliphatic-aromatic copolyester compositions.

For the foregoing reasons, there remains a long felt, unmet need to develop improved processes to effectively utilize polyester scrap.

There further remains a long felt, unmet need to need to develop new processes for making high molecular weight aliphatic-aromatic copolyesters, having good color and other thermal and mechanical properties.

Further for the foregoing reasons, there remains a long unfelt need to develop new articles from molding compositions that that have useful performance properties, particularly where the articles utilize aliphatic-aromatic copolyesters derived from polyester scrap.

SUMMARY

The invention relates to a biodegradable composition comprising a combination of:
(i) from more than 10 to 59.99 wt. %, based on the total weight of the composition, of an aliphatic aromatic copolyester having a number average molecular weight of at least 20,000 Daltons and a polydispersity index from 2 to less than 6, specifically 2 to 5, wherein the copolyester comprises:
  (a) a first dihydric alcohol group derived from a first dihydric alcohol selected from the group consisting of ethylene glycol, 1,2-propylene glycol, 1,3-propylene glycol, 1,2-butanediol, 2,3-butanediol, 1,4-butanediol, tetramethyl cyclobutanediol, isosorbide, hexylene glycol, bio-derived diols, and a combination thereof,
  (b) an aromatic dicarboxylic acid group derived from a reaction of
    (bi) the first dihydric alcohol,
    (bii) an aromatic polyester selected from the group consisting of poly(ethylene terephthalate), poly(butylene terephthalate), polytrimethylene terephthalate, and a combination thereof, and
    (biii) an aliphatic dicarboxylic acid having the general formula $(CH_2)_m(COOH)_2$, where m is an integer from 2 to 10,
  (c) an aliphatic dicarboxylic acid group,
  (d) a second dihydric alcohol group derived from the polyester and incorporated into the copolyester when the polyester reacts with the first dihydric alcohol and the aliphatic dicarboxylic acid, wherein the second dihydric alcohol group is the residue of ethylene glycol, 1,2-propylene glycol, 1,3-propylene glycol, 1,2-butanediol, 2,3-butanediol, 1,4-butanediol, tetramethyl cyclobutanediol, isosorbide, a cyclohexanedimethanol, a hexylene glycol, a bio-derived diol, and a combination thereof,
  (e) the residue of from 0 to 0.10 wt. %, based on the aliphatic-aromatic copolyester, of a phosphate compound, and
  (f) the residue of from 0 to 1.50 wt. %, based on the aliphatic-aromatic copolyester, of an addition copolymer comprising the residue of a glycidyl monomer;
(ii) from more than 40 to less than 89.99 wt. %, based on the total weight of the composition, of an aliphatic polyester, aliphatic polycarbonate, starch, aromatic polyester, cycloaliphatic polyester, polyesteramide, or aromatic polycarbonate; and
(iii) from 0.01 to 5.00 wt. %, based on the total weight of the composition, of a nucleating agent, antioxidant, UV stabilizer, plasticizer, epoxy compound, melt strength additive, or a combination thereof;
wherein the wt. % of (i), (ii), and (iii) totals 100 wt. %; and
wherein a bar having a thickness of 3.2 mm molded from the composition has a notched Izod impact strength of at least 920 J/m determined in accordance with ASTM D256 at 23° C., and a flexural modulus of at least 750 MPa determined in accordance with ASTM D790.

In another embodiment, the invention relates to a biodegradable composition comprising:
(i) from more than 93.4, e.g., more than 95 wt. %, based on the total weight of the composition, of a copolyester having a number average molecular weight of at least 20,000 Daltons and a polydispersity index from 2 to 6, specifically 2 to 5, wherein the copolyester comprises:
  (a) a first dihydric alcohol group derived from a first dihydric alcohol selected from the group consisting of ethylene glycol, 1,2-propylene glycol, 1,3-propylene glycol, 1,2-butanediol, 2,3-butanediol, 1,4-butanediol, tetramethyl cyclobutanediol, isosorbide, hexylene glycols, bio-derived diols and a combination thereof,
  (b) an aromatic dicarboxylic acid group derived from a reaction of
    (bi) a first dihydric alcohol,
    (bii) an aromatic polyester selected from the group consisting of poly(ethylene terephthalate), poly(butylene terephthalate), polytrimethylene terephthalate, and a combination thereof, and
    (biii) an aliphatic dicarboxylic acid having the general formula $(CH_2)_m(COOH)_2$, wherein m is an integer from 2 to 10,
  (c) an aliphatic dicarboxylic acid group derived from the aliphatic dicarboxylic acid, and
  (d) a second dihydric alcohol group derived from the polyester and incorporated into the copolyester when the polyester reacts with the first dihydric alcohol and the aliphatic dicarboxylic acid, wherein the second dihydric alcohol group is the residue of ethylene glycol, 1,2-propylene glycol, 1,3-propylene glycol, 1,2-butanediol, 2,3-butanediol, 1,4-butanediol, tetramethyl cyclobutanediol, isosorbide, a cyclohexanedimethanol, a hexylene glycol, a bio-derived diol, and a combination thereof, (e) the residue of from 0 to 0.10 wt. %, based on the aliphatic-aromatic copolyester, of a compound containing a phosphate group, and (f) the residue of from 0 to 1.50 wt. %, based on the aliphatic-aromatic copolyester, of an addition copolymer comprising the residue of a glycidyl monomer; and (ii) from 0 to 5 wt. % of a nucleating agent, an antioxidant, or combination thereof, wherein the wt. % of components (i) and (ii) totals 100 wt %.

In another embodiment, a process for making a biodegradable copolyester comprises:

a) reacting (1) an aromatic polyester with (2) a first dihydric alcohol selected from the group consisting of ethylene glycol, propylene glycol, butylene glycol, 1,4-butanediol tetramethyl cyclobutanediol, isosorbide, cyclohexanedimethanol, bio-derived alcohols, and hexylene glycol, and (3) an aliphatic dicarboxylic acid of the formula $(CH_2)_m(COOH)_2$, wherein m is 4 to 10, at a temperature from 160° C. to less than 250° C. in the presence of a transition metal catalyst, e.g., a titanium alkoxide catalyst to form a first mixture;

b) subjecting the first mixture to vacuum distillation at a pressure of less than 2 Torr and a temperature of 220 to less than 260° C., to form a molten copolyester; and c) optionally reacting the molten copolyester with from 0 to 1.50 wt. % of a phosphate compound, from 0 to 1.50 wt. % of an addition copolymer comprising the residue of a glycidyl monomer, or a combination thereof, for at least 5 minutes, to form the copolyester.

In another embodiment, the invention relates to a process for making the biodegradable composition, the process comprising a) reacting (1) an aromatic polyester with (2) a first dihydric alcohol selected from the group consisting of ethylene glycol, propylene glycol, butylene glycol, 1,4-butanediol tetramethyl cyclobutanediol, isosorbide, cyclohexanedimethanol, bio-derived diols, and hexylene glycol, and (3) an aliphatic dicarboxylic acid of the formula $(CH_2)_m(COOH)_2$, wherein m is 4 to 10, at a temperature from 160° C. to less than 250° C. in the presence of a transition metal catalyst to form a first mixture;

b) subjecting the first mixture to vacuum distillation at a pressure of less than 2 Torr and a temperature of 220 to less than 260° C., to form a molten copolyester; and c) optionally reacting the molten copolyester with from 0 to 1.50 wt. % of a phosphate compound, from 0 to 1.50 wt. % of an addition copolymer comprising the residue of a glycidyl monomer, or a combination thereof, for at least 5 minutes, to form the copolyester; and (d) adding to the aliphatic-aromatic copolyester:

(i) from more than 40 to 89.99 wt. %, based on the total weight of the composition, of a polymer selected from the group consisting of an aliphatic polyester, aliphatic polycarbonate, starch, aromatic polyester, cycloaliphatic polyester, polyesteramide, aromatic polycarbonate, and a combination thereof; and (ii) from 0.01 to 5.00 wt. % of an additive selected from the group consisting of a nucleating agent, antioxidant, UV stabilizer, plasticizer, epoxy compound, melt strength additive, and a combination thereof, to form the biodegradable composition;

wherein the total wt. % of the copolymer, the polymer, and the additive is 100 wt. %.

The invention also relates to articles made from the compositions described above, e.g., films or sheets.

DESCRIPTION OF THE FIGURE

The FIGURE shows apparent melt viscosity property changes of materials discussed in the Examples.

These and other features, aspects, and advantages of the present invention will become better understood with reference to the following description and appended claims.

DETAILED DESCRIPTION

This invention is based on the discovery that it is possible make a biodegradable composition in situ from used polyesters, where the composition is suitable for film packaging applications. Advantageously, the utilization of used polyesters allows a polyester that would otherwise be discarded as waste to be used productively. In one embodiment, the biodegradable composition can also be made with renewable materials such as adipic acid, sebacic acid, and bio-glycols such as bio-1,3-propane diol. By using a specific combination of stabilizers, we have also discovered that we can also make a composition with a copolyester having a white color, which is extremely useful for film packaging applications.

Our biodegradable composition includes various versions. In one version, our composition includes a combination of an aliphatic-aromatic copolyester, a second polymer, and an additive. Our composition can also include the combination of the aliphatic-aromatic copolyester.

The term "white," as used in this application, means that the material being described as white exhibits an L* value that is at least 75, or at least 80, or at least 85 with a corresponding set of "a" and "b" values that are substantially close to 0, (less than 5 units on the CIE color scale), where the "a" represents red and green hues and "b" represents blue and yellow hues of the white material on the CIE LAB color scale. The L* value can range from 75, or 80, or 85 to 100. The "L*, a, b" method for describing colors is will known and developed by the CIE (Commission Internationale de l'Eclairage). The CIE provides recommendations for colorimetry by specifying the illuminants, the observer and the methodology used to derive values for describing color 3 coordinates are utilized to locate a color in a color space which is represented by L*, a* and b*. When a color is expressed in CIELAB, L* defines lightness, if a value is closer to 0 it means total absorption or how dark a color is. If the L* value is closer to 100 it means total reflection or how light a color is. a* denotes how green or red a color is, whereas b* represents how blue or yellow a color is.

The term "recycle" as used herein refers to any component that has been manufactured and either used or intended for scrap. Thus, a recycle polyester can be polyester that has been used, for example in drinking bottle, or that is a byproduct of a manufacturing process, for example that does not meet a required specification and therefore would otherwise be discarded or scrapped. Recycle materials can therefore contain virgin materials that have not been utilized.

The prefix "bio-" or "bio-derived" as used herein means that the compound or composition is ultimately derived from a biological source, e.g., "bio-1,3-propane diol" is derived from a biological (e.g., plant or microbial source) rather than a petroleum source. Similarly, the prefix "petroleum-" or "petroleum-derived" means that the compound or composition is ultimately derived from a petroleum source, e.g., a "petroleum-derived poly(ethylene terephthalate) is derived from reactants that are themselves derived from petroleum.

The singular forms "a," "an," and "the" include plural referents unless the context clearly dictates otherwise. Further unless defined otherwise, technical, and scientific terms used herein have the same meaning as is commonly understood by one of skill in the art to which this invention belongs. Compounds are described using standard nomenclature. For example, any position not substituted by any indicated group is understood to have its valency filled by a bond as indicated, or a hydrogen atom. A dash ("-") that is not between two letters or symbols is used to indicate a point of attachment for a substituent. For example, —CHO is attached through carbon of the carbonyl group.

Other than in operating examples or where otherwise indicated, all numbers or expressions referring to quantities of ingredients, reaction conditions, and the like, used in the specification and claims are to be understood as modified in all instances by the term "about." Various numerical is present in an amount from are disclosed in this patent application. Because these is present in an amount from are continuous, they include every value between the minimum and maximum values. Unless expressly indicated otherwise, the various numerical is present in an amount from specified in this application are approximations. The endpoints of all ranges directed to the same component or property are inclusive and independently combinable.

All ASTM tests and data are from the 2003 edition of the Annual Book of ASTM Standards unless otherwise indicated.

The compositions include a biodegradable aliphatic-aromatic copolyester that is derived in situ from the reaction of a dihydroxy compound and an aliphatic dicarboxylic ace with an aromatic polyester, in particular a recycle poly(ethylene terephthalate). Accordingly, the copolyester contains (a) a first dihydric alcohol group; (b) an aromatic dicarboxylic acid, (c) an aliphatic dicarboxylic acid group; and (d) a second dihydric alcohol group. In one embodiment, a residue of a compound containing a phosphate group (e) is present, the residue of an addition copolymer based on a glycidyl monomer, that is, an addition polymer comprising the residue of a glycidyl monomer (f) is present, or a combination thereof.

The first dihydric alcohol group incorporated into the copolyester can be derived from any first dihydric alcohol that reacts with the aliphatic dicarboxylic acid and the aromatic polyester to form the first dihydric alcohol group in the copolyester. Examples of suitable dihydric alcohols can include ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), bio-derived diols, hexylene glycols, and a combination thereof. Any of the foregoing dihydric alcohols can be derived from a biological source. In one embodiment all or a portion of the dihydric alcohols are derived from a biological source. "Bio-derived diols" as used herein refers alcohols other than those named and derived from a biological source, e.g., various pentoses, hexoses, and the like. The first dihydric alcohol is generally added to a mixture containing the aromatic polyester and the aliphatic dicarboxylic acid.

The aromatic dicarboxylic acid group is incorporated into the copolyester forms when the polyester reacts with the first dihydric alcohol and the aliphatic dicarboxylic acid under conditions sufficient to form the copolyester. Examples of the aromatic dicarboxylic acid group include isophthalic acid groups, terephthalic acid groups, and a combination thereof. The aromatic polyester is thus a polyester containing aromatic dicarboxylic acid residues, and can be any aromatic polyester, which when reacted with the first dihydric alcohol and an aliphatic dicarboxylic acid, forms a copolyester containing aromatic dicarboxylic acid groups, first dihydric alcohol groups, and second dihydric alcohol groups. In one embodiment, the aromatic polyester contains (i) at least 40 mole % of total acid groups as aromatic dicarboxylic acid groups and (ii) is selected from the group consisting of poly(ethylene terephthalate), poly(butylene terephthalate), polypropylene terephthalate, copolymers of the foregoing, and combinations thereof. Specific examples of suitable aromatic polyesters include poly(ethylene terephthalate), poly(butylene terephthalate), polytrimethylene terephthalate, and combinations thereof. The aromatic polyester can be petroleum-derived or bio-derived, and in one embodiment is a recycle aromatic polyester, for example recycle poly(ethylene terephthalate). The recycle polyester can be in any form, e.g., flakes, pellets, and the like.

The aliphatic dicarboxylic acid group is incorporated into the copolyester when the aromatic polyester reacts with the first dihydric alcohol and the aliphatic dicarboxylic acid to form the copolyester. Examples of the aliphatic dicarboxylic acid include components having the general formula $(CH_2)_m(COOH)_2$, where m is an integer from 2 to 10. The aliphatic dicarboxylic acid can be decanedioic acid, adipic acid, or sebacic acid. When the aliphatic dicarboxylic acid is adipic acid, the value of m is 4. When the aliphatic dicarboxylic acid is sebacic acid, the value m is 8. In one embodiment all or a portion of the aliphatic dicarboxylic acid is a bio-derived aliphatic dicarboxylic acid.

The aliphatic-aromatic copolyester further comprises a second dihydric alcohol group that is derived from the aromatic polyester, and that is incorporated into the copolyester when the first dihydric alcohol reacts with the aromatic polyester in the presence of the aliphatic dicarboxylic acid. As such, unlike the first dihydric alcohol, the second dihydric alcohol is not added to a mixture containing the polyester and the aliphatic dicarboxylic acid. Examples of suitable second dihydric alcohol groups can include the residues of ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol (including 1,2-, 1,3-, and 1,4-cyclohexane dimethanol), hexylene glycol, and a combination thereof. Because the second dihydric alcohol groups are derived from the aromatic polyester, the first and the second dihydric alcohol groups can be the same or different. For example, the first dihydric alcohol groups can be residues of 1,4-butanediol, 1,3-propanediol, ethylene glycol, or combinations thereof and the second dihydric alcohol groups can be ethylene glycol, diethylene glycol, 1,3-propanediol, 1,4-butanediol, or combinations thereof. The first dihydric alcohol groups and the second dihydric alcohol groups are the same in one embodiment. The first dihydric alcohol groups and the second dihydric alcohol groups are different in another embodiment.

In a specific embodiment, the first dihydric alcohol is 1,4-butanediol, 1,3-propanediol, ethylene glycol, or a combination thereof the aliphatic dicarboxylic acid is decanedioic acid, adipic acid, sebacic acid, or a combination thereof, the second dihydric alcohol group is the residue of ethylene glycol, 1,3-propanediol, 1,4-butanediol, or a combination thereof, and the aromatic polyester is a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, and combinations thereof.

The amount the first dihydric alcohol group and the second dihydric alcohol group in the copolyester can vary. In one embodiment, the first dihydric alcohol group is present in an amount from 80 to 99.6 mole % of total dihydric alcohol content and the second dihydric alcohol group is present in an amount from 0.4 mole % to 20.0 mole % of the total dihydric alcohol content. In another embodiment, the first dihydric alcohol group is present in an amount from 85 to 99.4 mole % of total content of dihydric alcohol groups in the composition and the second dihydric alcohol group is present in an amount from 0.6 to 15.0 mole % of the total dihydric alcohol content.

The relative amounts of the aromatic dicarboxylic acid group and the aliphatic dicarboxylic acid group can vary. In one embodiment, the aromatic dicarboxylic group and the aliphatic dicarboxylic group have an aromatic dicarboxylic group:aliphatic dicarboxylic group mole ratio from 0.6:1 to 6:1. In another embodiment, the aromatic dicarboxylic group and the aliphatic dicarboxylic group are present at an aromatic dicarboxylic group:aliphatic dicarboxylic group mole ratio from 0.6:1 to 1.3:1.

The content of aromatic acid groups (in particular isophthalic acid groups and terephthalic acid groups) in the copolyester will vary depending on the aromatic polyester used and the reaction conditions. In one embodiment the aromatic dicarboxylic acid group contains from 0.2 to 3.0 mole % of isophthalic acid group and from 47 to 49.8 mole % percent of terephthalic acid groups, based on the total moles of acid groups present in the copolymer.

In a specific embodiment, the first dihydric alcohol group is present in an amount from 80 to 99.6 mole % of the total dihydric alcohol content and the second dihydric alcohol group is present in an amount from 0.4 mole % to 20.0 mole % of the total dihydric alcohol content, the aromatic dicarboxylic group and the aliphatic dicarboxylic group have an aromatic dicarboxylic group:aliphatic dicarboxylic mole ratio from 0.6:1 to 6:1, and the aromatic dicarboxylic acid group contains from 0.2 to 3.0 mole % of isophthalic acid groups and from 47 to 49.8 mole % terephthalic acid groups, each based on the total moles of dicarboxylic acid groups in the copolymer.

The copolyesters can further comprise other residues present in the aromatic polyester, including catalyst residues from the manufacture of the aromatic polyester, residues from additives in the aromatic polyester, or residues arising from side reactions that occur during manufacture of the aromatic polyester and/or the reaction of the first dihydric alcohol, the aliphatic diacid, and the aromatic polyester.

For example, when the aromatic polyester includes a poly(ethylene terephthalate) component, the aromatic polyester can include a poly(ethylene terephthalate) homopolymer, a poly(ethylene terephthalate) copolymer, or a combination thereof, and the aliphatic-aromatic copolyester contains a residue derived from the poly(ethylene terephthalate) composition. Residues derived from the poly(ethylene terephthalate) component can be ethylene glycol groups, diethylene glycol groups, isophthalic acid groups, antimony-containing compounds, germanium-containing compounds, titanium-containing compounds, cobalt-containing compounds, tin-containing compounds, aluminum, aluminum salts, 1,3-cyclohexanedimethanol isomers, 1,4-cyclohexanedimethanol isomers, alkaline salts, alkaline earth metal salts, phosphorous-containing compounds and anions, sulfur-containing compounds and anions, naphthalene dicarboxylic acids, 1,3-propanediol groups, or combinations thereof. In one embodiment, the residue derived from the poly(ethylene terephthalate) component comprises ethylene glycol groups, diethylene glycol groups, and more particularly a combination of ethylene glycol groups, diethylene glycol groups.

Accordingly, our invention includes embodiments in which the residue derived from the poly(ethylene terephthalate) component includes individual elements and combinations of the foregoing materials. The residue derived from the poly(ethylene terephthalate) component, for instance, can comprise isophthalic acid groups. In an embodiment, the residue derived from the poly(ethylene terephthalate) component further comprises the cis isomer of 1,3-cyclohexanedimethanol, cis isomer of 1,4-cyclohexanedimethanol, trans isomer of 1,3-cyclohexanedimethanol, trans isomer of 1,4-cyclohexanedimethanol and combinations thereof. In one embodiment, the residue derived from the poly(ethylene terephthalate) component includes a combination of ethylene glycol and diethylene glycol groups, optionally with isophthalic acid groups, and can further comprise the cis isomer of 1,3-cyclohexanedimethanol, the cis isomer of 1,4-cyclohexanedimethanol, the trans isomer of 1,3-cyclohexanedimethanol, trans isomer of 1,4-cyclohexanedimethanol, or combinations thereof. In an embodiment, the residue derived from the polyethylene terephthalate component comprises ethylene glycol groups, diethylene glycol groups, isophthalic acid groups, the cis isomer of cyclohexanedimethanol, the trans isomer of cyclohexanedimethanol, and combinations thereof. In an embodiment, the residue derived from the poly(ethylene terephthalate) component comprises ethylene glycol groups, diethylene glycol groups, and cobalt-containing compounds; in another embodiment the a residue derived from the poly(ethylene terephthalate) component further comprises isophthalic acid groups.

When the aromatic polyester is poly(butylene terephthalate), the composition can contain poly(butylene terephthalate) residues such as butane diol, titanium, tin, or combinations thereof, optionally together with epoxies.

When the aromatic polyester is poly(trimethylene terephthalate), the composition contains poly(trimethylene terephthalate) residues such as propane diol, titanium, tin, or combinations thereof.

The copolyester generally has a number average molecular weight of at least 20,000 Daltons and a polydispersity index from 2 to less than 6, specifically 2 to 5. In one embodiment, the copolyester has a glass transition temperature (Tg) from −35° C. to 0° C. In another embodiment, the copolyester has a melting temperature (Tm) from 90° C. to 160° C.

The copolyester can be made by any suitable method using the aromatic polyester, the first dihydric alcohol, and the aliphatic diacid. In one embodiment, the copolyester is manufactured by reacting the aromatic polyester with the first dihydric alcohol and the aliphatic dicarboxylic acid at a temperature at an elevated temperature in the presence of a transition metal catalyst, to form a first mixture, and subjecting the first to a reduced pressure and an elevated temperature to form the copolyester.

The copolyester can also be made with additional materials that can be present during any of the manufacturing steps, or added after formation of the molten copolyester, or after cooling of the molten copolyester.

For example, in an optional embodiment, the molten copolyester is further reacted with a phosphate compound for an effective time, for example at least 5 minutes, specifically from 5 minutes to two hours. In this embodiment, the aliphatic-aromatic copolyester further comprises a residue of the phosphate compound, either associated with the copolymer or covalently bound to the copolymer. Examples of the compound containing a phosphate group include inorganic phosphate-containing compounds such as phosphoric acid, zinc phosphate, and the like. The phosphate compound can be present in an amount from 0 to 0.10 wt. % of the molten copolyester. Reacting can be at a temperature of, for example, less than or equal to 250° C.

In another optional embodiment, the molten copolyester is further reacted with an addition copolymer comprising the residue of a glycidyl ester monomer for an effective time, for example at least 5 minutes, specifically from 5 minutes to two hours. In this embodiment, the aliphatic-aromatic copolyester further comprises a residue of the addition copolymer, either associated with the copolymer or covalently bound to the copolymer. Examples of the an addition copolymer based on a glycidyl monomer include an addition copolymer comprising the residue of glycidyl acrylate, glycidyl methacrylate, or a combination thereof and the residue of methyl methacrylate, methyl acrylate, styrene, alpha-methyl styrene, butyl methacrylate butyl acrylate, or combinations thereof, for example styrene and methyl methacrylate. The addition copolymer can be present in an amount from 0 to 1.50 wt. % of the molten copolyester. Reacting can be at a temperature of, for example, less than or equal to 250° C.

In a specific embodiment, the molten copolyester is further reacted with the phosphate compound and the addition polymer, thereby providing the copolymer with a residue of the phosphate compound and a residue of the addition copolymer. Thus, the copolyester is manufactured by: a) reacting an aromatic polyester with a first dihydric alcohol and an aliphatic dicarboxylic acid at a temperature from 160° C. to less than 250° C. in the presence of a titanium alkoxide catalyst, to form a first mixture, wherein the dihydric alcohol is ethylene glycol, propylene glycol, butylene glycol, 1,4-butanediol tetramethyl cyclobutanediol, isosorbide, cyclohexanedimethanol, a bio-derived diol, or hexylene glycol and wherein the aliphatic dicarboxylic acid is of the general formula $(CH_2)_m(COOH)_2$, wherein m=4 to 10; (b) subjecting the first mixture to a pressure of less than 2 Torr, e.g., by vacuum distillation, and a temperature of 220 to less than 260° C. to form the copolyester; and (c) reacting the molten copolyester with a phosphate compound and an addition copolymer based on a glycidyl compound for at least 5 minutes, and thereby forming the copolyester. Reacting can be at a temperature of, for example, less than or equal to 250° C.

The biodegradable composition of the invention includes, in addition to the copolyester, other components combined with the copolyester, for example other polymers and additives, for example additives used in the formulation of molding compositions. Examples of the polymers include aliphatic polyesters, aromatic polycarbonates, aliphatic polycarbonates, starches, aromatic polyesters, aromatic polyesters, cycloaliphatic polyesters, polyesteramides, and the like. The polymers can be wholly or partially bio-derived, including petroleum-derived aromatic polyesters and bio-derived aromatic polyesters.

In a specific embodiment the copolyester is combined with an aliphatic polyester, for example poly(lactic acid), polyhydroxyalkanoate, poly(butylene succinate), poly(butylene adipate), poly(butylene succinate adipate) and poly (caprolactone), or a combination thereof. Polyhydroxyalkanoates (PHAs) are linear polyesters produced in nature by bacterial fermentation of sugar or lipids, and include, for example, poly(R-3-hydroxybutyrate) (PHB or poly(3HB)).

In another specific embodiment the copolyester is combined with an aromatic polyester, for example a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, or a combination thereof.

The amounts of the copolyesters and the additives, for example a polymer can vary depending on the desired properties of the biodegradable composition. In an embodiment the additives are present in an amount from 2 to 90 wt. %, for example from 2 to 40 wt. % or from 40 to 90 wt. %, based on the total weight of the composition. When the copolyester is used with starch, the amount of starch can range from 40 to 90 wt. %, and the amount of polyester can range from 10 to 60%, based on the total weight of the total composition. When the copolyester is used in conjunction with polylactic acid, the amount of the copolyester can range from 40 to 90 wt % and the amount of polylactic acid can range from 10 to 60 wt. %, specifically 40 to 60%, based on the total weight of the composition.

Additives ordinarily incorporated into polymer compositions can be used, with the proviso that the additives are selected so as to not significantly adversely affect the desired properties of the composition, for example, biodegradability, impact, flexural strength, color, and the like. Such additives can be mixed at a suitable time during the mixing of the components for forming the composition. Possible additives include impact modifiers, fillers, reinforcing agents, antioxidants, heat stabilizers, light stabilizers, ultraviolet light (UV) absorbers, plasticizers, lubricants, mold release agents, antistatic agents, colorants, blowing agents, flame retardants, anti-drip agents, and radiation stabilizers. Combinations of additives can be used, for example an antioxidant, a UV absorber, and a mold release agent. The total amount of additives (other than any impact modifier, filler, or reinforcing agents) is generally 0.01 to 5 wt. %, based on the total weight of the composition. In a specific embodiment, from 0.01 to 5.00 wt. % of a nucleating agent, antioxidant, UV stabilizer, plasticizers, epoxy compound, melt strength additive, or a combination thereof is used.

In one embodiment, the composition has a Notched impact strength as per ASTM D256 method of at least 920 J/m and a flexural modulus as per ASTM D790 of at least 750 MPa.

Advantageously, the copolyester and compositions containing the copolyester can be biodegradable. This means that the copolyester and compositions containing the copolyester exhibit aerobic biodegradability, as determined by ISO 14855-1:2005. ISO 14855-1:2005, as is known, specifies a method for the determination of the ultimate aerobic biodegradability of plastics, based on organic compounds, under controlled composting conditions by measurement of the amount of carbon dioxide evolved and the degree of disintegration of the plastic at the end of the test. This method is designed to simulate typical aerobic composting conditions for the organic fraction of solid mixed municipal waste. The test material is exposed to an inoculum, which is derived from compost. The composting takes place in an environment wherein temperature, aeration and humidity are closely monitored and controlled. The test method is designed to yield the percentage conversion of the carbon in the test material to evolved carbon dioxide as well as the rate of conversion. Also specified is a variant of the method, using a mineral bed (vermiculite) inoculated with thermophilic microorganisms obtained from compost with a specific activation phase, instead of mature compost. This variant is designed to yield the percentage of carbon in the test substance converted to carbon dioxide and the rate of conversion. Generally, our copolyesters (and compositions containing copolyesters) exhibit a biodegradation (measured in % of solid carbon of the test item that is converted into gaseous, mineral C in the form of $CO_2$), which is at least 30% after 75 days. In one embodiment, the copolyesters (and compositions containing copolyesters) exhibit a biodegradation, which is at least 40% or 50% after 75 days. The biodegradation of the copolyesters (and compositions containing copolyesters) can range from at least 30% to 50%, or at least 30% to 60%, or at least 30% to 70%.

Advantageously, useful articles can be made from the copolyester and compositions containing the copolyester. In a specific embodiment, an article is extruded, calendared, or molded, for example blow molded or injection molded from the copolymer or the composition containing the copolymer. The article can be a film or a sheet. When the article is a film, the article can be formed by extrusion molding or calendaring the copolyester or composition containing the copolyester. The copolyesters and compositions containing the copolyesters are useful for films, for example film packaging applications, among other applications.

The typical film of the copolyester or copolyester composition has a modulus of elasticity as per ISO 527 method of at least 520 N/mm$^2$, a tensile strength as per ISO 527 of at least 27 N/mm$^2$, and a tear strength as per DIN 53373 of at least 38 J/mm.

As stated above, various combinations of the foregoing embodiments can be used.

The invention is further described in the following illustrative examples in which all parts and percentages are by weight unless otherwise indicated.

EXAMPLES

Following is a list of materials, acronyms, and selected sources used in the examples.
PET: Poly(ethylene terephthalate)
BDO: 1,4-Butanediol (from BASF, with a purity specification of 99.5 wt. %)
PDO: 1,3-Propanediol (from various commercial sources)
SBA: Sebacic Acid (from INVISTA)
ADA: Adipic Acid (from INVISTA)
TPT: Tetraisopropyl titanate (from DuPont, commercial Tyzor grade)
TOT: Tetraorthobutenyl titanate (from Sigma-Aldrich)
PBT-co-sebacate: Poly(butylene terephthalate)-co-sebacate
PBT-co-adipate: Poly(butylene terephthalate)-co-adipate
PPT-co-sebacate: Poly(propylene terephthalate)-co-sebacate
CESA: Styrene-acrylate-epoxy oligomer
MZP: Zinc-bis-dihydrogen phosphate
TNPP: Trisnonylphenyl phosphate
SDP: Monosodium phosphate
SAPP: Sodium acid pyrophosphate
PLA: Poly(lactic acid)
HP: Phosphoric acid
IR 1330: IRGANOX 1330
IR 1010: IRGANOX 1010
TIDP: Triisododecylphospite
TPP Triphenylphosphite
Recycle PET in the form of flakes or pellets was obtained from a commercial vendor headquartered in India.

Examples 1-3

The purpose of Examples 1-3 was to prepare the copolyester PBT-co-sebacate derived from PET in accordance with the invention. The overall quantity of individual materials and the reaction scale used in the laboratory and pilot scale for Examples 1-3 are shown in Table 1.

TABLE 1

Amount of raw materials, reaction scale and reaction conditions for Examples 1-3.

| Ex. No. | Scale of Reaction (g) | PET:BDO (mol/mol) | SBA:BDO (mol/mol) | Catalyst Ti (ppm) | EI[1] Temp. (° C.) | EI Time (min) | Poly[2] Temp. (° C.) | Poly[2] Time (min) |
|---|---|---|---|---|---|---|---|---|
| 1 | 143.2 | 0.53 | 0.23 | 100 | 220 | 44 | 250 | 40 |
| 2 | 143.2 | 0.38 | 0.38 | 100 | 220 | 46 | 250 | 33 |
| 3 | 33180 | 0.39 | 0.39 | 100 | 225 | 50 | 250 | 180 |

[1]EI = Ester interchange;
[2]Poly = Polymerization.

Techniques and Procedures Examples 1-3

Example 1

In Example 1, PBT-co-sebacate derived from PET was prepared in a lab reactor from recycle PET flakes. Thus, 48 g (0.25 mol) of PET flakes, 50.6 g (0.25 mol) of sebacic acid (SBA) and 58 g (0.65 mol) of 1,4-butanediol (BDO) were introduced into a three neck round bottom flask. The reactor was placed in an oil bath the temperature of which was adjusted to 170° C. Next, 100 ppm of tetraisopropyl titanate (TPT) was added to the reaction mixture and the ester interchange (EI) temperature was increased to 220° C. with a rate of 2° C./min while stirring at 260 rpm under nitrogen. The ester interchange step was completed in 46 minutes. The temperature of the reaction mixture was increased to 250° C. The residual PET flakes was completely melted in 10 minutes. The polymerization stage was conducted at the same temperature with the vacuum adjusted to less than 1 Torr for 33 minutes.

Example 2

In Example 2, PBT-co-sebacate derived from PET was prepared on a lab scale with the same raw materials in a mole ratio of 0.35:0.15:0.65 (PET flakes:SBA:BDO). The process steps and conditions were otherwise identical to those of Example 1.

Example 3

Example 3 shows the pilot plant scale-up of the manufacture of PBT-co-sebacate polymer derived from PET. The helicone reactor had a capacity of 200 liters and was equipped with a special design of twin opposing helical blades with a 270 degree twist; constructed of 316 stainless steel with 16 g polish finish. The blade speed could be varied from 1 to 65 rpm. The agitators were connected to a Constant Torque Inverter Duty Motor, which operated at 230/460 VAC, 3 PH, and 60 Hz. These agitators provided excellent surface area for the polymer melt in order to build molecular weight. The helicone was also designed with an overhead condenser to condense the vapors in the glycolysis, transesterification (if any) and polymerization stages.

PET flakes (10.18 kg, 52.74 mol), BDO (12.29 kg, 136.4 mol), SBA (10.70 kg, 52.74 mol), and TPT (10.7 ml) were charged to the helicon reactor at 175° C. under nitrogen atmosphere. The agitator speed was set at 67% of maximum. Heating continued to 225° C. The butanediol was refluxed into the reactor for 2 hours. The design of the overhead condenser system did not allow a complete reflux of the butanediol.

For the polymerization stage (also referred to as 'poly stage'), the temperature of the heating oil (for the helicone) was set to 250° C. Then a vacuum was applied to the helicone reactor and the reflux of butanediol to the reactor was discontinued. The speed of the agitator was set to 60% of max and the target amps of the motor were 3.5 amps. The system pressure was brought down to 1.2 mm Hg by the vacuum blower. During polymerization or polycondensation stage, excess BDO, and residual ethylene glycol (EG) were removed, along with tetrahydrofuran (THF) and water. The reaction was carried out until the polymer mass reached its end of $2^{nd}$ build. The reaction was stopped and the polymer was cast in blobs. The products were then allowed to dry and ground into pellets.

Results Examples 1-3

Results for Examples 1-3 are shown in Tables 2 and 3. Table 2 shows the glass transition temperature ($T_g$), melting temperature ($T_m$) obtained from differential scanning calorimetry (DSC), molecular weight data obtained from gel permeation chromatography (GPC), and intrinsic viscosity (I. V.) for the Examples 1, 2, and 3. Table 2 also shows melt volume rate (MVR) and melt flow rate (MFR) for the Example 3. MVR and MFR on pellets (dried for 2 hours at 80° C. prior to measurement) were measured according to ISO 1133 at 190° C. and 2.16 kg. Table 3 shows the composition of the polymers as determined by $^1$H NMR analysis. A capillary rheometer was used to determine an apparent melt viscosity according to ISO 11443 when a sample was sheared at a wide range of shear rate at a temperature of 170 and 190° C. A 1 mm inside-diametric and 20 mm long orifice was used for measurement.

TABLE 2

Thermal, molecular weight, and I.V. analysis results.

| Ex. No. | Tg (° C.) | Tm (° C.) | Mn | Mw | PDI | I.V. | MVR (mL · 10 min$^{-1}$) | MFR (mL · 10 min$^{-1}$) |
|---|---|---|---|---|---|---|---|---|
| 1 | −14 | 150 | 27000 | 129000 | 4.7 | 1.044 | NA | NA |
| 2 | −27 | 103 | 29500 | 138000 | 4.7 | 1.257 | NA | NA |
| 3 | −32 | 103 | 34000 | 135000 | 4.0 | 1.255 | 8.01 | 8.19 |

TABLE 3

Composition analysis results for PBT-co-sebacate resin derived from PET.

| Ex. No. | Isophthalic Groups Mole % | Terephthalic Groups Mole % | Sebacic Groups Mole % | BDO Groups Mole % | EG Groups Mole % |
|---|---|---|---|---|---|
| 1 | 0.8 | 35.7 | 14.4 | 45.5 | 3.6 |
| 2 | 0.7 | 26.1 | 23.9 | 48.0 | 1.3 |
| 3 | 0.6 | 26.4 | 24.1 | 46.9 | 2.1 |

Discussion Examples 1-3

The results indicate that the aliphatic-aromatic copolyester PBT-co-sebacate derived from PET in accordance with the invention was successfully prepared. The results show that the process that was used to make the copolyester enabled the copolyester to obtain a high molecular weight. The results also show that residues of the poly(ethylene terephthalate) that was used to make the copolyester were incorporated into the copolyester. Also, Example 3 confirmed that the laboratory scale process of Example 1 could be scaled up successfully. As shown in Table 3, Example 2 shows greater incorporation of sebacic acid compared to either Example 1 or Example 3, which is consistent with the difference in charge ratios shown in Table 1.

Examples 4-5

The purpose of Examples 4-5 was to make the aliphatic-aromatic copolyester PBT-co-adipate derived from PET in accordance to the invention. The overall quantity of individual materials and the reaction scale used in the laboratory and pilot scale for Examples 1-3 are shown in Table 4.

TABLE 4

Amount of raw materials, reaction scale, and reaction condition for Examples 4-5.

| Ex. No. | Scale of Reaction (g) | PET:BDO (mol/mol) | ADA:BDO (mol/mol) | Catalyst Ti (ppm) | EI Temp. (° C.) | EI Time (min) | Poly Temp. (° C.) | Poly Time (min) |
|---|---|---|---|---|---|---|---|---|
| 4 | 143 | 0.39 | 0.39 | 100 | 220 | 33 | 230 | 65 |
| 5 | 27300 | 0.39 | 0.39 | 100 | 225 | 150 | 230 | 180 |

Techniques and Procedures Examples 4-5

Example 4

(PBT-co-adipate) (Example 4) was prepared in lab-scale from recycle PET, adipic acid (ADA) and 1,4-butanediol (BDO). 48 g of recycle PET, 36.5 g of ADA and 58 g of BDO were introduced into a three neck round bottom flask. The reactor was placed in an oil bath the temperature of which was adjusted to 170° C. 100 ppm of TPT was added to the reaction mixture and the ester interchange temperature was increased to 220° C. with a rate of 2° C./min while stirring at 260 rpm under nitrogen. The temperature of the reaction mixture was increased to 250° C. to melt the residual PET flakes completely. The reactor temperature was then decreased to 230° C. and the polymerization stage was initiated with the vacuum adjusted to below 1 Torr for 1 hour. At the end of the polymerization stage, the vacuum was stopped. 0.05 wt. % phosphoric acid and 0.25 wt. % CESA (the multi-functional epoxy-based chain-extender made from styrene-acrylic oligomer) were added to the melt and the mixture was agitated for 30 minutes under nitrogen at atmospheric pressure.

Example 5

PBT-co-Adipate, Example 5 was prepared in a pilot plant scale-up facility, which is described under the section, Example 3. 9.18 kg of recycle PET, 6.98 kg of adipic acid and 11.07 kg of 1,4-butanediol were charged to the helicone reactor temperature of which was adjusted to 170° C. 10.6 mL of TPT was added to the reaction mixture and the ester interchange temperature was increased to 225° C. under nitrogen. The agitator speed was set at 67% of maximum. The butanediol was refluxed into the reactor for 2 hours. It should be noted that the design of the overhead condenser system did not allow a complete reflux of the butanediol. As a result, about 5 to 10 lbs (2.3 to 4.5 kg) of butanediol evolved in the initial stages could not be refluxed. The butanediol evolved after that could be completely refluxed into the reactor.

The temperature of the reaction mixture was increased to 250° C. to melt the residual PET flakes completely. The speed of the agitator was set to 60% of max and the target amps of the motor were 3.5 amps. The reactor temperature was then decreased to 230° C. and the polymerization stage was initiated with the vacuum adjusted to below 1 Torr for 180 minutes. The reaction was carried out until the polymer mass reached its 2 and half build. Then, 13.61 g of phosphoric acid and 68.00 g of CESA were added to the melt and the mixture is agitated for 30 minutes under nitrogen at atmospheric pressure. The products were then allowed to dry and ground into pellets.

Results Examples 4-5

The results obtained for Examples 4 and 5 are shown in Table 5, Table 6, and FIG. 1. More particularly, Table 5 provides $T_g$, $T_m$, molecular weight, and I. V. Table 5 also shows MVR and MFR for Example 5. MVR and MFR on pellets (dried for 2 hours at 80° C. prior to measurement) were measured according to ISO 1133 at 190° C. and 2.16 kg. The composition of the polymers obtained by $^1$H NMR analysis is displayed in Table 6. FIG. 1 shows the apparent melt viscosity change of materials in Example 4 versus various apparent shear rates in comparison with those of a commercial PBT-co-adipate copolymer. Diffuse reflectance was acquired on a Gretag Macbeth Color-Eye 7000A with D65 illumination, 10° observer, CIE L*, a*, b*, specular included, UV included, large lens position, large aperture. Table 6 shows the L*, a*, b* values of example 4 and 5.

TABLE 5

Thermal, molecular weight and I.V. analysis results for Examples 4-5.

| Ex. No. | $T_g$ (° C.) | $T_m$ (° C.) | $M_n$ | $M_w$ | PDI | I.V. | MVR (mL · 10 min$^{-1}$) | MFR (mL · 10 min$^{-1}$) |
|---|---|---|---|---|---|---|---|---|
| 4 | −27 | 111 | 28200 | 134000 | 4.7 | 0.955 | NA | NA |
| 5 | −27 | 107 | 30700 | 114900 | 3.70 | 1.134 | 10.81 | 10.27 |

TABLE 6

Composition analysis results obtained from H$^1$ NMR for Examples 4-5.

| Ex. No. | Isophthalic Groups Mole % | Terephthalic Groups Mole % | Adipic Groups Mole % | BDO Mole % | EG Groups Mole % |
|---|---|---|---|---|---|
| 4 | 0.6 | 26.3 | 24.0 | 47.6 | 1.5 |
| 5 | 0.6 | 26.4 | 24.1 | 47.0 | 1.9 |

TABLE 7

Diffuse reflectance analysis of example 4 -5.

| Ex. No. | L* | a* | b* |
|---|---|---|---|
| 4 | 78.892 | −2.467 | 3.866 |
| 5 | 60.932 | −1.801 | 9.502 |

FIG. 1 shows the apparent melt viscosity change of Example 5 versus various apparent shear rates in comparison with those of a commercial PBT-co-adipate copolymer.

Discussion Examples 4-5

The results of Examples 4 and 5 show that materials of Example 4 have the low apparent shear rate viscosity at 170 and 190° C. due to its low melting temperature and molecular weight. However, the molecular weight of Example 5 is almost similar to the molecular weight of the commercial PBT-co-adipate. The melting temperature of Example 5 is 10° C. lower compared to the commercial PBT-co-adipate (Commercial PBT-co-adipate, $T_m$=117° C., PBT-co-adipate prepared from PET, $T_m$=107° C. and PBT-co-sebacate prepared from PET, $T_m$=103° C.). Therefore, the PBT-co-adipate prepared from the PET process provides advantage for blow molding at lower temperature. Since the molecular weights are comparable, here the flow difference is mainly ascribed to the $T_m$ of the polymers.

FIG. 1 shows the plot of the apparent shear viscosity of commercial PBT-co-adipate, Example 4, and Example 5, versus apparent shear rate. The high apparent shear viscosity at lower apparent shear rate is desirable for blow molding processes. The apparent shear viscosity depends on the melting temperature and molecular weight of the targeted polymers. The commercial PBT-co-adipate has the highest apparent viscosity at 170 and 190° C. because its melting temperature is 117° C. and molecular weight is 30400. Example 5, a pilot plant scale run, confirms that the laboratory scale process of Example 4 can be successfully scaled up.

Comparative Examples A-S

The purpose of these examples was to compare the effect of various parameters on the process described in Example 4.

Techniques and Procedures Comparative Examples
A-C

Copolyesters were prepared as described in Comparative Examples A-C to investigate the effect of the polymerization temperature on the final color of PBT-co-adipate copolymer from recycle PET. The process of Example 4 was repeated, except that the additives used and process conditions differed as described below.

The copolyester of Comparative Example A was prepared from 48 g of recycle PET, 36.5 g of adipic acid and 58 g of 1,4-butanediol. 100 ppm of TPT was added to the reaction mixture and the ester interchange temperature was increased to 220° C. with a rate of 2° C./min while stirring at 260 rpm under nitrogen. The temperature of the reaction mixture was increased to 250° C. and the polymerization stage was initiated with the vacuum adjusted to below 1 Torr for 30 minutes. The resulting copolymer displayed red color. The result of the diffuse reflectance analysis is given in Table 9.

In comparative Example B, the temperature of the reaction mixture was increased to 250° C. and then decreased to 220° C. The polymerization stage was initiated with the vacuum adjusted to below 1 Torr for 1 hour. The resulting copolymer displayed slightly pink color.

The polymerization temperature of the comparative Example C was kept at 200° C. under the vacuum adjusted to below 1 Torr for 170 minutes. The final product showed white color.

Techniques and Procedures Comparative Examples
D-F

The purpose of comparative examples D-F was to understand the effect of addition of a phenolic antioxidant in the composition containing the copolyester. Comparative Examples D-F was prepared using the same formulation reported above for Examples A to C with slight changes. In comparative Examples D-E, 0.1 wt. % hindered phenolic antioxidant IRGANOX® 1330 was added to the formulations.

The polymerization temperature of Comparative Example D was kept at 250° C. under the vacuum adjusted to below 1 Torr for 30 minutes. The resulting polymer was pink color.

The polymerization of Comparative Example E was carried out at 230° C. under the vacuum adjusted to below 1 Torr for 60 minutes. The resulting polymer was white color.

In comparative Example F, 0.1 wt. % hindered phenolic antioxidant IRGANOX® 1010 was added to the same comonomer mixture. The polymerization temperature was 230° C. and a constant vacuum adjusted to 1 Torr was applied for 60 minutes. The polymer displayed red color.

Techniques and Procedures Comparative Examples
G-I

In these Comparative Examples, tetrabutyl orthotitanate (TOT) was used to understand the effect if any, of the catalyst on the final color of the copolymer resin. Comparative Examples G-I was implemented using the same formulation except for polymerization catalyst.

Comparative Example G was prepared in the presence of 100 ppm of TOT. A polymerization build was not observed.

Comparative Examples H-I were prepared in the presence of TOT-TPT catalyst mixture at polymerization temperature of 250 and 230° C. respectively. Dark brown and pale brown colors were observed.

Techniques and Procedures Comparative Examples
J-S

The purpose of Comparative Examples J-S was to understand the effect of phosphate additives and/or glycidyl copolymer additives in the copolyesters. Comparative Examples J-S were prepared using the same polymerization condition described above.

In comparative Examples J-O, 0.05 wt. % of MZP, TNPP, SDP, SAPP, triisododecyl phosphate, and triphenylphosphite were respectively added to the melt and the respective mixture was agitated for 30 minutes under nitrogen at atmospheric pressure.

Comparative Examples P-Q were prepared with the addition of 0.01 wt. % phosphoric acid and 0.1 wt. % phosphoric acid to the melt. The viscosity of the resulting mixture dropped for both Examples.

Comparative Example R was prepared with the addition of 0.25 wt. % of CESA. A viscosity increase was observed, but the color of the polymer remained red. In Comparative Example S, 0.25 wt. % CESA and 0.05 wt. % phosphoric acid were added to the melt and the mixture is agitated for 30 minutes under nitrogen at atmospheric pressure. The color of the polymer changed into pale yellow.

Results Comparative Examples A-S

Table 8 summarizes the additive, polymerization time, thermal, molecular weight, polydispersity index, intrinsic viscosity and color data of the Comparative Examples A-S.

more, the copolyesters that are produced do not exhibit desired balance of properties. For instance, the copolyesters of Comparative Examples A, B, D, F, H, I, J, K, L, M, N, O, P, Q, R, S were not white. The copolyesters obtained in Comparative Examples C and E were acceptably white, but had a polydispersity index value greater than 5, which was undesired. The copolyester of invention, Example 4, where a combination of CESA and phosphoric acid is used at 230° C., exhibited a good balance of properties including color and polydispersity as shown in Table 7. The copolyesters of

TABLE 8

Additive, thermal, molecular weight, and results of comparative examples.

| Ex. No. | Add. | PI | Poly Temp. (° C.) | Cat. | Poly Time | $T_g$ (° C.) | $T_m$ (° C.) | $M_n$ | $M_w$ | I.V. | Color |
|---|---|---|---|---|---|---|---|---|---|---|---|
| 4 | CESA + HP | 4.7 | 230 C. | TPT | 65 | -27 | 111 | 28200 | 134000 | 0.955 | White |
| A** | None | 4.6 | 250 | TPT | 27 | -24 | 116 | 27500 | 125000 | 0.991 | Red |
| B* | None | 6.2 | 220 | TPT | 85 | -29 | 111 | 28000 | 173000 | 0.976 | Pink |
| C* | None | 5.5 | 200 | TPT | 120 | -25 | 112 | 31000 | 170000 | 1.095 | White |
| D | IR 1330 | 7.6 | 250 | TPT | 28 | -24 | 115 | 26000 | 198000 | 0.807 | Pink |
| E | IR 1330 | 6.1 | 230 | TPT | 58 | -24 | 114 | 29500 | 179000 | 1.142 | White |
| F | IR 1010 | 7.1 | 230 | TPT | 57 | -24 | 114 | 29500 | 210000 | 1.179 | Red |
| G | None | | 250 | TOT | | | | | | | |
| H | None | 3.4 | 250 | TOT + TPT | 32 | -23 | 114 | 28200 | 96000 | 0.952 | Dark Brown |
| I | None | 3.2 | 230 | TOT + TPT | 66 | -25 | 113 | 30100 | 97500 | 1.017 | Pale Brown |
| J | MZP | 3.5 | 250 | TPT | 26 | -25 | 117 | 23500 | 81500 | 0.960 | Brown |
| K | TNPP | 3.3 | 250 | TPT | 28 | -24 | 114 | 27500 | 91000 | 0.963 | Brown |
| L | SDP | 2.6 | 250 | TPT | 27 | -27 | 118 | 16300 | 42000 | 0.550 | Pink |
| M | SAPP | 3.7 | 250 | TPT | 28 | -28 | 115 | 22000 | 82000 | 0.735 | Pink |
| N | TPIDPe | 3.3 | 250 | TPT | 25 | -24 | 116 | 28000 | 92000 | 0.932 | Brown |
| O | TPP | 2.6 | 250 | TPT | 30 | -27 | 117 | 12500 | 31500 | 0.376 | Pink |
| P | Low HP | 2.8 | 250 | TPT | 31 | -25 | 118 | 20500 | 58000 | 0.718 | Pink |
| Q | High HP | 3.2 | 250 | TPT | 27 | -32 | 117 | 9000 | 28500 | 0.232 | Yellow |
| R | Cesa | 5.1 | 250 | TPT | 27 | -17 | 108 | 17000 | 86000 | 1.253 | Red |
| S | Cesa + HP | 3.0 | 250 | TPT | 32 | -27 | 118 | 17000 | 51000 | 0.568 | Pale Yellow |

*Polydispersity Index
**Composition disclosed U.S. Pat. No. 5,446,079 and U.S. Publication No. 20080081898

TABLE 9

Diffuse reflectance analysis of example A.

| Ex. No. | L* | a* | b* |
|---|---|---|---|
| A | 61.97 | 12.21 | 13.64 |

Discussion Comparative Examples A-S

The results of Comparative Examples A-S show that a good balance of properties such as white color, high molecular weight, and a polydispersity index of less than 6, and an acceptable reaction time for the preparation of copolyesters can be achieved only when appropriate combination of additives and temperature are chosen for the reactions.

When copolyesters are not made with an additive combination containing a phosphate group and an addition copolymer based on a glycidyl monomer, and when the process is carried out at a temperature that is 250° C. or Comparative Examples A, D, H, J, K, L, M, N, O, P, Q, R and S, which were polymerized at 250° C. were all colored, though the copolyester of Comparative Example S, based on a combination of phosphate and addition copolymer, CESA provided the least intensely colored sample (pale yellow color). It is important to note that at 250° C., as per examples, S, R, and Q, a combination of CESA and phosphoric acid is more effective than the individual additives in reducing the intensity of coloration.

Examples 6-7

The purpose of Examples 6-7 was to prepare the copolyester PPT-co-sebacate derived from PET The overall quantity of individual materials and the reaction scale used in the laboratory and pilot scale for Examples 1-3 are shown in Table 10.

TABLE 10

Amount of raw materials, reaction scale and reaction condition for Examples 6-7.

| Ex. No. | Scale of Reaction (g) | PET:PDO (mol/mol) | SBA:PDO (mol/mol) | Catalyst Ti (ppm) | EI Temp. (° C.) | EI Time (min) | Poly Temp. (° C.) | Poly Time (min) |
|---|---|---|---|---|---|---|---|---|
| 6 | 143 | 0.39 | 0.39 | 100 | 220 | 50 | 230 | 66 |
| 7 | 9100 | 0.17 | 0.17 | 100 | 185 | 60 | 260 | 120 |

Techniques and Procedures Examples 6-7

Example 6

PPT-co-sebacate was prepared from recycle PET, sebacic acid, and 1,3-propanediol. Then, 48 g of recycle PET, 50.4 g of sebacic acid and 54 g of 1,3-propanediol were introduced into a three neck round bottom flask. The reactor was placed in an oil bath the temperature of which was adjusted to 170° C. TPT was added to the reaction mixture and the ester interchange temperature was increased to 220° C. with a rate of 2° C./min while stirring at 260 rpm under nitrogen. The reaction mixture was increased to 250° C. to melt any residual PET flakes. Polymerization stage was conducted at 230° C. with the vacuum adjusted to below one Torr for 1 hour.

Example 7

In Example 7, PPT-co-sebacate was prepared in a larger scale in comparison to the Example 6. The procedure followed for the preparation was similar to the procedure used in Example 6 and the molar ratio of PET:PDO and SBA:PDO was used as indicated in Table 10.

Results Examples 6-7

Table 11 shows the $T_g$, $T_m$ obtained by DSC, molecular weight, melt volume rate (MVR), melt flow rate (MFR) and I. V. for the Examples 6-7. The compositions of the Examples 6-7 obtained through $^1$H NMR analysis are shown in Table 12.

TABLE 11

Thermal, molecular weight, and I.V. analysis results

| Ex. No | $T_g$ (° C.) | $T_m$ (° C.) | $M_n$ | $M_w$ | PDI | I.V. | MVR (mL · 10 min$^{-1}$) | MFR (mL · 10 min$^{-1}$) |
|---|---|---|---|---|---|---|---|---|
| 6 | −32 | 107 | 30103 | 97570 | 3.20 | 1.067 | NA | NA |
| 7 | −23 | 120 | 45000 | 134000 | 3.00 | 1.249 | 10.04 | 10.71 |

NA—'not available'.

TABLE 12

Composition analysis results of PPT-co-sebacate.

| Ex. No. | Isophthalic Groups Mole % | Terephthalic Groups Mole % | Sebacic Groups Mole % | PDO Mole % | EG Groups Mole % |
|---|---|---|---|---|---|
| 6 | 0.6 | 26.3 | 24.0 | 47.6 | 1.5 |
| 7 | 0.7 | 24.6 | 28.3 | 45.9 | 0.5 |

Discussion Examples 6-7

The results in Tables 11 and 12 show that a copolyester, PPT-co-sebacate derived from PET was successfully prepared in accordance with the invention. The results show that the process that was used to make the copolyester enabled a high molecular weight of copolyester. The results also show that residues of the poly(ethylene terephthalate) that was used to make the copolyester were incorporated into the copolyester. Also, as seen in Tables 11 and 12, PPT-co-sebacate copolyester of different $T_g$s and $T_m$s can be obtained by varying the charge ratios, PET:PDO and SBA:PDO as shown in Table 10.

Examples 8-9

The purpose of Examples 8-9 was to prepare copolyester molding compositions containing a nucleating agent and a thermal stabilizer.

Techniques and Procedures Examples 8-9

Example 8

Example 8 was prepared by dry mixing PBT-co-adipate copolymer derived from PET from Example 5 99.8%, ultra talc 0.1%, and IRGANOX® 1330 0.1% in a tumble dryer and then extruding the mix on a 30 mm twin screw extruder (with a maximum capacity of 75 lbs/hr) having 2 feeders and a vacuum vented mixing screw. The feed temperature was 194° F. (90° C.). The extrusion temperature was usually maintained between 248 and 367° F. (120 and 186° C.). The screw speed was 300 rpm. The extrudate was cooled through a water bath prior to pelletizing. Test parts were injection molded on a van Dorn molding machine. The pellets were dried for 1 hour at 115° F. (46° C.) in a forced air-circulating oven prior to injection molding. The zone temperature was set to 360° F. (183° C.). The mold temperature was 70° F. (21° C.). All standard parts were 0.125 inches (3.12 mm) thick.

Example 9

Example 9 was prepared by dry mixing PBT-co-sebacate resin derived from PET 99.8%, ultra talc 0.1%, and IRGANOX® 1330 0.1% in a tumble dryer and then extruding the mix on a 30 mm twin screw extruder (with a maximum capacity of 75 lbs/hr) having 2 feeders and a vacuum vented mixing screw. The feed temperature was 194° F. (90° C.). The extrusion temperature was usually maintained between 248 and 367° F. (120 and 186° C.). The screw speed was 300 rpm. The extrudate was cooled through a water bath prior to pelletizing. Test parts were injection molded on a van Dorn molding machine. The pellets were dried for 1 hour at 115° F. (46° C.) in a forced air-circulating oven prior to injection molding. The zone temperature was set to 360° F. (182° C.). The mold temperature was 70° F. (21° C.). All standard parts were 0.125 inches (3.12 mm) thick.

Testing Procedure for Molding Compositions

Injection molded parts were tested in accordance with ASTM methods. Notched Izod testing is done on three×½× ⅛ inch (76.2×12.7×3 2 mm) bars using ASTM method D256. Bars were notched prior to oven aging; samples were tested at room temperature. Unnotched Izod testing is done on 3×½×⅛ inch (76.2×12.7×3 2 mm) bars using ASTM D 4812. The tensile properties of low-modulus plastic are determined based on ASTM D638 using 7×⅛ in. (177.8×3.3 mm) injection molded dumbbell-shaped bars. The test employs a crosshead speed of 2 inches per minute and runs until the sample breaks or the crosshead reaches its extension limit Flexural properties were measured using ASTM 790 or ISO 178 method. Heat deflection temperature was tested on five bars having the dimensions 5×0.5×0.125 inches (127×12.7×3.2 mm) using ASTM method D648. The black specs were measured by counting the black specs present visually on the surface of a Dynatup disc.

A synopsis of the tests and test methods is given in Table 13.

TABLE 13

Test Methods and Descriptions

| | Test Standard | Default Specimen Type | Units |
|---|---|---|---|
| ASTM Flexural Test | ASTM D790 | Bar—127 × 12.7 × 3.2 mm | MPa |
| ASTM HDT Test | ASTM D648 | Bar—127 × 12.7 × 3.2 mm | ° C. |
| ASTM For Low modulus Plastics Tensile Test | ASTM D638 | ASTM Type I Tensile bar | MPa |
| ASTM Izod at Room Temperature | Notched ASTM D256 | Bar—63.5 × 12.7 × 3.2 mm | J/m |
| ASTM Izod at Room Temperature | Unnotched ASTM D4812 | Bar—63.5 × 12.7 × 3.2 mm | J/m |

Results Examples 8-9

The physical testing results of the molding compositions, Examples 8 and 9 are shown in Table 14.

TABLE 14

Physical testing results of Examples 8-9

| Tests | Units | Commercial PBT-co-adipate | PBT-co-adipate, (Example 8) derived from PET | PBT-co-sebacate, (Example 9) derived from PET |
|---|---|---|---|---|
| HDT at Stress of 0.455 MPa | ° C. | 39.50 | 40.20 | 37.40 |
| HDT at Stress of 1.82 MPa | ° C. | 35.50 | 36.70 | 27.30 |
| Flexural Modulus | MPa | 107.00 | 86.80 | 48.60 |
| Flexural Modulus at 5% Strain | MPa | 5.00 | 4.17 | 2.89 |
| Flexural Stress at Yield | MPa | 6.94 | 6.03 | 2.77 |
| Flexural Stress at Break | MPa | | | 0.42 |
| IZOD Impact Notch, 23 C. | J/m | 220.00 | 198.00 | 136.00 |
| IZOD Impact Unnotched 23° C. | J/m | 240.00 | 190.00 | 120.00 |
| Modulus of Elasticity-Avg | MPa | 97.00 | 79.00 | 48.00 |
| Stress at 5% Strain-Avg | MPa | 1.10 | 0.90 | 0.60 |
| Stress at 10% Strain-Avg | MPa | 6.00 | 5.00 | 3.50 |
| Stress at 50% Strain-Avg | MPa | 6.80 | 5.80 | 4.10 |
| Stress at Break-Avg | MPa | 15.00 | | |
| Elongation at Break-Avg | % | 349.00 | | |
| Nominal Strain at Break-Avg | % | 1527.50 | | |

Discussion Examples 8-9

As seen in Table 14, both the copolyesters, PBT-co-adipate derived from PET pellets and PBT-co-sebacate derived from PET pellets, have mechanical properties that are different from those of a commercial copolyester sample of PBT-co-adipate, though the thermal properties (HDT values) appear to be similar Between PBT-co-adipate derived from PET pellets and PBT-co-sebacate derived from PET pellets, the former has properties closer to those of the commercial samples of PBT-co-adipate. The flexural modulus, Izod impact, and modulus of elasticity of PBT-co-adipate and PBT-co-sebacate are lower compared to commercial PBT-co-adipate resin. Especially, PBT-co-sebacate prepared from PET shows very low crystallinity resulting in high flexibility. In addition, molded parts of PBT-co-adipate prepared from PET pellets and PBT-co-sebacate prepared from PET pellets did not break at maximum elongation. The low crystalline nature, higher flexibility and higher resistance to maximum elongation of PBT-co-adipate prepared from PET and PBT-co-sebacate prepared from PET may provide several advantages in blow extrusion processes and final film properties, such as easy stretching condition, energy saving, high transparency and thinner films.

Examples 10-11

The purpose of Examples 10 and 11 was to prepare combinations of PBT-co-adipate from PET pellets and PBT-co-sebacate from PET respectively with starch.

Techniques and Procedures Examples 10-11

Example 10

Example 10 was prepared by dry mixing corn starch 30.0%, PBT-co-adipate copolymer 69.9%, and IRGANOX® 1330 0.1% in a tumble dryer and then extruding the mix on a 30 mm twin screw extruder (with a maximum capacity of 75 lbs/hr) having 2 feeders and a vacuum vented mixing screw. The feed temperature was 320° F. (160° C.). The extrusion temperature was usually maintained between 248 and 320° F. (120 and 160° C.). The screw speed was 300 rpm. The extrudate was cooled through a water bath prior to pelletizing. Test parts were injection molded on a van Dorn molding machine. The pellets were dried for 1 hour at 115° F. (46° C.) in a forced air-circulating oven prior to injection molding. The zone temperature was set to 360° F. (183° C.). The mold temperature was 70° F. (21° C.). All standard parts were 0.125 inches (3.12 mm) thick.

Example 11

The purpose of Example 11 was to prepare a combination of PBT-co-sebacate from PET with starch. Example 11 was prepared by dry mixing corn starch (30.0 wt. %), PBT-co-sebacate (69.9 wt. %), and IRGANOX® 1330 (0.1 wt. %) in a tumble dryer and then extruding the mix on a 30 mm twin screw extruder (with a maximum capacity of 75 lbs/hr) having 2 feeders and a vacuum vented mixing screw using the same compounding condition mentioned in the Examples 10.

Examples 12-13

The purpose of Examples 12 and 13 was to prepare the combinations of PBT-co-adipate derived from PET pellets and PBT-co-sebacate derived from PET respectively with PLA.

Techniques and Procedures Examples 12-13

Example 12

A copolyester combination was prepared by dry mixing PLA (45. wt. %), PBT-co-adipate copolymer derived from PET (54.9 wt. %), and IRGANOX® 1330 (0.1 wt. %) in a tumble dryer and then extruding the mix on a 30 mm twin screw extruder (with a maximum capacity of 75 lbs/hr) having 2 feeders and a vacuum vented mixing screw. The feed temperature was 320° F. (160° C.). The extrusion temperature was usually maintained between 320 and 329° F. The screw speed was 300 rpm. The extrudate was cooled through a water bath prior to pelletizing. Test parts were injection molded on a van Dorn molding machine. The pellets were dried for 1 hour at 115° F. (46° C.) in a forced air-circulating oven prior to injection molding. The zone temperature was set to 360° F. (183° C.). The mold temperature was 70° F. (21° C.). All standard parts were 0.125 inches (3.12 mm) thick.

Example 13

Example 13 was prepared by dry mixing PLA (45.0 wt. %, PBT-co-sebacate copolymer (54.9 wt. %, and IRGANOX® 1330 (0.1 wt. %) in a tumble dryer and then extruding the mix on a 30 mm twin screw extruder (with a maximum capacity of 75 lbs/hr) having 2 feeders and a vacuum vented mixing screw using the same compounding condition stated in Examples 12.

Results Examples 12-13

The results of physical testing of the PLA combinations, Examples 12 and 13 are given in the Table 15.

TABLE 15

Physical testing results of Example 12 and Example 13.

| Tests | Units | PLA + Commercial PBT-co-Adipate** | PLA + PBT-co Adipate derived from PET (Example 12) | PLA + PBT-co-Sebacate derived from PET (Example 13) |
|---|---|---|---|---|
| HDT at Stress of 1.82 MPa | ° C. | 45.40 | 47.30 | 47.70 |
| Flexural Modulus | MPa | 779.00 | 1270.00 | 1270.00 |
| Flexural Stress at Yield | MPa | 24.10 | 34.20 | 30.40 |
| Flexural Stress at 5% Strain | MPa | 22.00 | 34.10 | 29.50 |
| IZOD Impact Notch, 23 C. | J/m | 927.00 | 1230.00 | 1010.00 |
| IZOD Impact Unnotched 23° C. | J/m | 968.00 | 1380.00 | 967.00 |
| Modulus of Elasticity-Avg | MPa | 778.00 | 1280.00 | 1254.00 |
| Stress at 5% Strain-Avg | MPa | 5.90 | 9.30 | 8.90 |
| Stress at 10% Strain-Avg | MPa | 16.00 | 21.00 | 18.80 |
| Stress at 50% Strain-Avg | MPa | 16.00 | 15.80 | 15.90 |
| Stress at Break-Avg | MPa | 17.30 | 9.40 | 17.10 |
| Elongation at Break-Avg | % | 356.30 | 229.20 | 315.00 |
| Nominal Strain at Break-Avg | % | 1293.00 | 428.00 | 666.70 |

**Combination with commercial copolyester prepared in accordance to the procedure described above in Example 13.

Discussion Examples 10-13

As seen in Table 13, the combinations of PLA with the copolyesters, either PBT-co-adipate derived from PET or PBT-co-sebacate derived from PET, have comparable or superior mechanical properties when compared with a commercial sample of PLA-PBT-co-adipate combination. The mechanical properties, particularly, flexural modulus, flexural stress, Izod impact values, modulus of elasticity and stress and 5-10% strain values of a combination of PLA with PBT-co-adipate derived from PET are superior to those of both the PLA combinations of commercial sample of PBT-co-adipate derived from PET and PBT-co-sebacate derived from PET. The Examples 12 and 13 are non-limiting examples, and for a person skilled in the art, numerous combination compositions would therefore be possible to tune the properties of these combinations to the extent desired.

All cited patents, patent applications, and other references are incorporated herein by reference in their entirety.

Although the present invention has been described in detail with reference to certain preferred versions thereof, other variations are possible. Therefore, the spirit and scope of the appended claims should not be limited to the description of the versions contained therein.

What is claimed is:

1. A biodegradable composition comprising a combination of:
   (i) from more than 93.4 wt. %, based on the total weight of the composition, of an aliphatic-aromatic copolyester having a number average molecular weight of at least 20,000 Daltons, a polydispersity index from 2 to 6, a Tg from −35° C. to 0° C., and a Tm from 90° C. to 160° C., wherein the aliphatic-aromatic copolyester comprises:
      (a) a first dihydric alcohol group derived from a first dihydric alcohol selected from the group consisting of ethylene glycol, 1,2-propylene glycol, 1,3-propylene glycol, 1,2-butanediol, 2,3-butanediol, 1,4-butanediol, tetramethyl cyclobutanediol, isosorbide, cyclohexane dimethanol, hexylene glycols, bio-derived diols and a combination thereof,
      (b) an aromatic dicarboxylic acid group derived from an aromatic polyester selected from the group consisting of poly(ethylene terephthalate), poly(butylene terephthalate), polytrimethylene terephthalate, and a combination thereof,
      (c) an aliphatic dicarboxylic acid group derived from an aliphatic dicarboxylic acid having the general formula $(CH_2)_m(COOH)_2$, wherein m is an integer from 2 to 10,
      (d) a second dihydric alcohol group derived from the aromatic polyester and incorporated into the aliphatic-aromatic copolyester when the aromatic polyester reacts with the first dihydric alcohol and the aliphatic dicarboxylic acid, wherein the second dihydric alcohol group is the residue of ethylene glycol, 1,2-propylene glycol, 1,3-propylene glycol, 1,2-butanediol, 2,3-butanediol, 1,4-butanediol, tetramethyl cyclobutanediol, isosorbide, a cyclohexanedimethanol, a hexylene glycol, a bio-derived diol, and a combination thereof,
      (e) the residue of from more than 0 to 0.10 wt. %, based on the aliphatic-aromatic copolyester, of phosphoric acid, and
      (f) the residue of from more than 0 to 1.50 wt. %, based on the aliphatic-aromatic copolyester, of an addition copolymer comprising the residue of a glycidyl monomer; and
   (ii) from 0 to 5 wt. % of a nucleating agent, an antioxidant, or combination thereof, wherein the sum of the wt. % of (i) and (ii) is 100 wt. %,
   wherein a film extruded from the composition is white.

2. The composition of claim 1, wherein the addition copolymer comprises a residue selected from the group consisting of glycidyl acrylate, glycidyl methacrylate, and a combination thereof; and a residue selected from the group consisting of methyl methacrylate, methyl acrylate, styrene, alpha-methyl styrene, butyl methacrylate, butyl acrylate, and a combination thereof.

3. The composition of claim 1, wherein the aromatic dicarboxylic acid group is a terephthalic acid group, isophthalic acid group, or a mixture thereof.

4. The composition of claim 3, wherein the isophthalic acid group is present in an amount from 0.2 to 3.0 mole % of the total moles of acid groups in the composition.

5. The composition of claim 1, wherein the first dihydric alcohol group is present in an amount from 80 mole % to 99.4 mole %, and the second dihydric alcohol group is present in an amount from 0.6 mole % to 20.0 mole %, each based on the total moles of dihydric alcohol groups in the composition.

6. The composition of claim 1, wherein the aromatic dicarboxylic group and the aliphatic dicarboxylic group are present in a mole ratio of aromatic dicarboxylic group: aliphatic dicarboxylic group from 0.6:1 to 1.3:1.

7. The composition of claim 1, wherein the first dihydric alcohol is selected from the group consisting of 1,4-butanediol, 1,3-propanediol, and combinations thereof and the second dihydric alcohol is ethylene glycol.

8. The composition of claim 1, wherein the aliphatic dicarboxylic acid is adipic acid.

9. The composition of claim 1, wherein the composition comprises from 0.01 to 5.00 wt. % of an additive selected from the group consisting of the nucleating agent, the antioxidant, a UV stabilizer, a plasticizer, an epoxy compound, and a combination thereof.

10. The composition of claim 1, wherein the aromatic polyester is a poly(trimethylene terephthalate) derived from petroleum-derived 1,3-propanediol, poly(trimethylene terephthalate) derived from bio-derived 1,3-propanediol, poly(butylene terephthalate) derived from petroleum-derived 1,4-butanediol, poly(butylene terephthalate) derived from bio-derived 1,4-butanediol, poly(trimethylene terephthalate) derived from post-consumer poly(ethylene terephthalate), poly(butylene terephthalate) derived from post-consumer poly(ethylene terephthalate), virgin poly(ethylene terephthalate), recycled poly(ethylene terephthalate), post-consumer poly(ethylene terephthalate), recycled poly(trimethylene terephthalate), recycled copolyesters of terephthalic acid with ethylene glycol and cyclohexane dimethanol, and combinations thereof.

11. The composition of claim 1, wherein the aromatic polyester is poly(butylene terephthalate) and the composition contains poly(butylene terephthalate) residues selected from the group consisting of butane diol, titanium, tin, epoxies, and combinations thereof.

12. The composition of claim 1, wherein the aromatic polyester is poly(trimethylene terephthalate) and the composition contains poly(trimethylene terephthalate) residues selected from the group consisting of propane diol, titanium, tin, and combinations thereof.

13. The composition of claim 1, wherein the aromatic polyester is a poly(ethylene terephthalate) homopolymer, a poly(ethylene terephthalate) copolymer, or a combination thereof, and the aliphatic-aromatic copolyester comprises an ethylene glycol group, diethylene glycol group, isophthalic acid group, antimony-containing compound, germanium-containing compound, titanium-containing compound, cobalt-containing compound, tin-containing compounds, aluminum, aluminum salt, 1,3-cyclohexanedimethanol isomer, 1,4-cyclohexanedimethanol isomer, alkaline salt, alkaline earth metal salt, phosphorous-containing compound or anion, sulfur-containing compound or anion, naphthalene dicarboxylic acid group, 1,3-propanediol group, or a combination thereof.

14. The composition of claim 1, wherein the film extruded from the composition has a modulus of elasticity of at least 520 N/mm2 as determined in accordance with as ISO 527, a tensile strength of at least 27 N/mm2 as determined in accordance with as per ISO 527, a tear strength of at least 38 J/mm as determined in accordance with as DIN 53373.

15. A process for making the composition of claim 1, the process comprising
   a) reacting
      (1) the aromatic polyester selected from the group consisting of poly(ethylene terephthalate), poly(butylene terephthalate), polytrimethylene terephthalate, and a combination thereof, with
      (2) the first dihydric alcohol selected from the group consisting of ethylene glycol, 1,2-propylene glycol, 1,3-propylene glycol, 1,2-butanediol, 2,3-butanediol, 1,4-butanediol tetramethyl cyclobutanediol, isosorbide, cyclohexanedimethanol, bio-derived diols, and hexylene glycol, and
      (3) an aliphatic dicarboxylic acid of the formula $(CH_2)_m(COOH)_2$, wherein m is 4 to 10,
   at a temperature from 160° C. to less than 250° C. in the presence of a titanium alkoxide catalyst to form a first mixture;
   b) subjecting the first mixture to vacuum distillation at a pressure of less than 2 Torr and a temperature of 220° C. to less than 260° C., to form a molten copolyester; and
   c) reacting the molten copolyester with from more than 0 to 1.50 wt. % of phosphoric acid, from more than 0 to 1.50 wt. % of an addition copolymer comprising the residue of a glycidyl monomer, or a combination thereof, for at least 5 minutes, to form the aliphatic-aromatic copolyester.

16. The process of claim 15, comprising reacting the molten copolyester with the phosphoric acid and the addition copolymer is at a temperature of 220 to 250° C.

* * * * *